Figure 1:
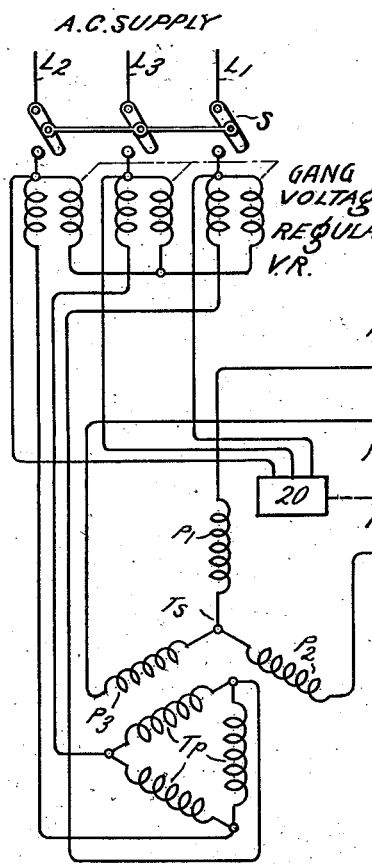
Figure 1:
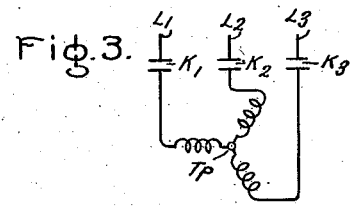

June 25, 1957  A. SCHMIDT, JR  2,797,381
SERIES CAPACITOR COMMUTATING COMBINATION
FOR MECHANICAL RECTIFIERS
Filed March 20, 1953  2 Sheets-Sheet 1

Inventor:
August Schmidt, Jr.
by *Gilbert P. Tarleton*
His Attorney.

Patented June 25, 1957

2,797,381

SERIES CAPACITOR COMMUTATING COMBINATION FOR MECHANICAL RECTIFIERS

August Schmidt, Jr., Schenectady, N. Y., assignor to General Electric Company, a corporation of New York Application March 20, 1953, Serial No. 343,736

8 Claims. (Cl. 321—48)

The invention relates to polyphase alternating current rectifiers of the mechanical type having synchronously timed overlapping contact means for connecting successive phase circuits of the rectifier to conduct the load current periodically and thereby produce the rectification.

The principal object is to provide an improved load current responsive series capacitor cumulative commutating voltage producing combination for completing the transfer of the load current from the outgoing phase circuit to the incoming phase circuit during fixed overlap periods of the contact means at the beginning and end of each conduction period of each phase circuit.

The invention provides improvements upon the single harmonically charged capacitor commutating system for mechanical rectifier shown and described in the joint application of Schmidt, Titus and Willis, Serial No. 172,134, filed July 5, 1950 and now issued as Patent 2,697,198, assigned to the assignee of the present invention. While such a single harmonic commutating capacitor will aid the normal phase to phase voltages in commutating load current between successive phase circuits during the contact overlap period, the single harmonic capacitor inherently limits the rectifier in three phase service to a sixty degree and in two phase service to a ninety degree contact conduction period.

Thus another object of the present invention is to free the mechanical rectifier from such contact conduction period limitations by providing a combination of capacitors, one in series with each of the phase circuits of the rectifier that are interconnected during the successive contact overlap periods for each producing a variable voltage proportional to the load current and having such coordination with the inductance of the phase circuit that the corresponding series connected capacitors will become cumulatively effective to jointly commutate the load current from each outgoing phase circuit to the succeeding incoming phase circuit in a predetermined time interval.

Another object is to preclose the rectifier contacts so that the phase to phase voltages normally producing commutation will become reversed during the fixed or constant contact overlap periods at the beginning and end of each contact conduction period and thereby enable the improved load current responsive series capacitor cumulative commutating voltage producing combination to complete the commutation of all values of the load current from zero upwards at substantially the same time during the fixed contact overlap periods.

Heretofore, mechanical rectifiers generally have been used in relatively constant load service and permissible variation of the load current was limited jointly by the duration of the contact overlap or commutating periods and the size of the commutating reactors commonly employed for preventing sparking upon opening of each contact to end the conduction period. Such limitations result whenever the normal phase to phase voltage is utilized for completing the commutation of the load current from the outgoing phase circuit to the incoming phase circuit before the end of the contact overlap period so that commutating reactors of reasonable size can be effective to prevent sparking. During each contact overlap period the incoming and outgoing phase circuits are interconnected for commutation of the load current therebetween, but the phase to phase voltage cannot start to commutate the load current therebetween until after the incoming phase voltage exceeds the outgoing phase voltage similar to an electronic rectifier. Also the reactance of each phase circuit inherently is fixed and during a fixed contact overlap period the total phase to phase volt-seconds effective for commutation remains fixed. Consequently, with commutating reactors of reasonable size it becomes necessary to vary the phase to phase volt-seconds in order to insure completion of the commutation of different values of load current between the fixed reactance phase circuits before the end of the contact overlap period. In order to increase or decrease the phase to phase volt-seconds, the duration of the contact overlap period must be varied correspondingly. Even then, unless quite large size and expensive commutating reactors are provided, contact sparking with resultant rapid contact erosion may occur in case the outgoing phase contact should ever open while carrying any appreciable load or circulating current due to the load current commutation being completed either too late or too soon.

In accordance with the usual practice a saturable commutating reactor is connected in series with each rectifier contact for unsaturating and thereby becoming effective during a brief interval dependent on the size of the reactor for temporarily limiting the current through the outgoing phase contact to a relatively low value just at the time the outgoing phase contact opens to end the contact overlap period at the end of the conduction period. With the aid of such commutating reactors, some variation of the load current within a range determined by the size of the reactor as well as some margin of error in the adjustment of the contact overlap period to correspond with the desired load current range can be tolerated. But it will be apparent that heretofore the adjusting or fixing of the mechanical rectifier contact overlap period practically fixed within quite definite limits the particular values of load current that can be successfully commutated without contact sparking. This has restricted the practical application of the mechanical rectifier to relatively constant load service. Hence the principal difficulty hampering a wider application of the overlapping contact mechanical type of rectifier has been the seemingly inherent limitations in both overload and underload capacity with fixed overlap periods of the contacts. The improved load current responsive series capacitor cumulative commutating voltage producing combination of the present invention effectively removes such limitations.

More specific objects of the present invention are: first to synchronize the contact overlap periods so as to reverse the phase to phase voltage during each contact overlap period and thereby substantially equalize or eliminate the normal phase to phase voltage commutating action by preclosing the incoming phase contact sufficiently early to start a fixed or constant overlap period with the outgoing phase contact a predetermined time before and end the overlap period a predetermined time after the instant of equality of the incoming and outgoing phase voltages and second, to provide an improved load current responsive series capacitor cumulative commutation voltage supply combination that will produce a variable cumulative commutating voltage proportional to the rectified load current in the phase circuits that are interconnected by the preclosed overlapping contacts so as to complete the transfer of all values of the load current from zero upward from the outgoing phase circuit to the incoming phase circuit at a predetermined time during a contact overlap period of constant or fixed duration.

The preclosed overlap period of the contacts and the series capacitor commutating combination of the present invention insure a commutating voltage that will always automatically vary from zero upward proportional to the load current to be commutated. As a result, the commutation of all values of load current is completed in the same time interval and the preclosed contact overlap periods can remain constant or fixed under all load conditions.

A further object is to enable the commutating reactor for each contact to serve also as a closing reactor for limiting the initial current at loads not exceeding the ultimate design value when the corresponding phase contact is preclosed to start the conduction period.

Without such closing reactor protection, some contact deterioration may result due to pre-striking of an arc or to contact bounce before the preclosed incoming phase contact becomes firmly closed with any appreciable voltage impressed thereon. However, this is effectively prevented in accordance with the present invention by reversing the saturating energization of the commutating reactor in an improved synchronization that enables the same reactor to limit the current through the corresponding phase contact to a negligible value at the beginning of the contact conduction period as well as at the end thereof.

Figure 3:
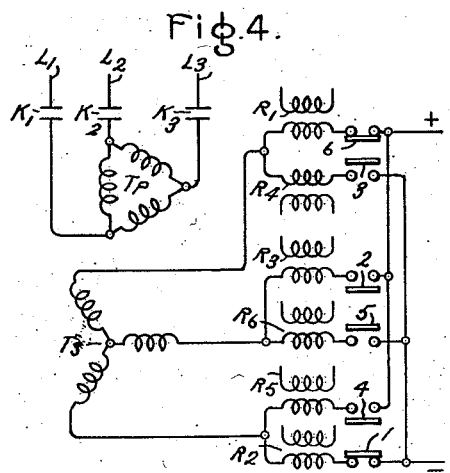
Figure 4:
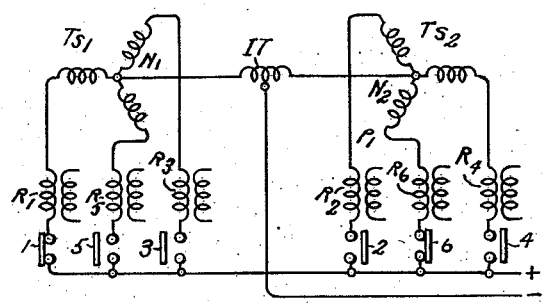
Figure 2:
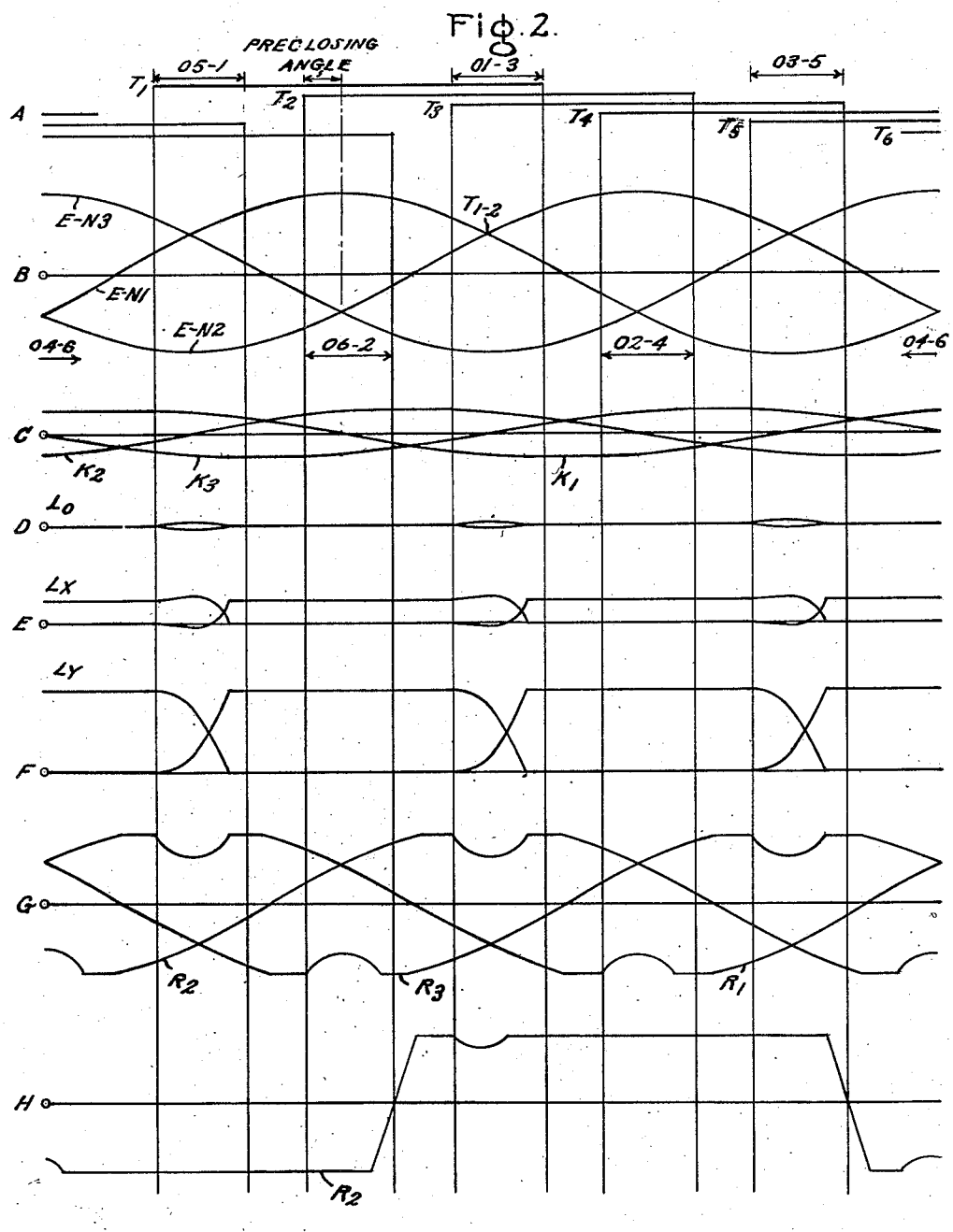

Further objects and advantages of the present invention will appear in the following description of the accompanying drawing in which Fig. 1 is a schematic representation of a mechanical rectifier embodying the several improvements of the present invention. Fig 2 comprises a series of diagrams having the same time scale to show the synchronized preclosing of the rectifier contact overlap periods with respect to the time of equality of the phase to neutral voltages and also indicate the timed relationships of the series capacitor commutating voltages produced by the load currents as well as the variations in the saturable commutating reactor magnetization to aid in understanding the operation of the improved rectifier commutating combination of Fig. 1. Figs. 3 and 4 show modified rectifier circuit arrangements embodying the invention.

As shown in Fig. 1, load current is supplied from the three phase alternating current supply lines L1, L2, L3 to the variable direct current load VL through a suitable main disconnect switch or protective circuit breaker S, a voltage regulator VR, a transformer having primary windings TP and secondary windings TS, the improved commutating voltage supply capacitor combination K1, K2, K3, each capacitor being connected in series with the corresponding phase circuits P1, P2, P3 of the transformer to reversely accumulate charges proportional to the load current, the corresponding series connected saturable reactors R1, R2, R3, and the periodically conducting sequential contacts 1, 3, 5, 4, 6, 2 of the mechanical rectifier MR that produce the rectification of the load current. The voltage regulator VR may be of any suitable type although as shown is of the variable inductive type. The primary transformer windings TP are shown as being delta connected and the secondary windings TS are Y-connected which conforms with the usual practice.

In accordance with the present invention the improved combination of commutation voltage supply capacitors K1, K2, K3 are provided and are shown series connected in the secondary phase circuits of the transformer in order to simplify an understanding of their functions. Preferably in actual practice these commutating capacitors may just as well be connected as shown in Figs. 3 and 4 in series with the polyphase alternating current supply lines L1, L2, L3 in order to utilize capacitors of the high voltage type. The load responsive commutating voltage supply is the same in each case as in either case each capacitor will always be charged proportionately to the variable load current supplied from each corresponding phase circuit to the variable direct current load VL.

As will be explained more fully hereinafter, the capacitive impedance value of each capacitor preferably is substantially proportional to the ratio of the inductance of the corresponding phase circuit to the contact overlap time. This insures that the charge stored in the series capacitor during the flow of the load current in the corresponding phase circuit will produce a voltage so coordinated with respect to the load current of the phase circuit and the contact overlap time as to cumulatively supply the necessary volt seconds required for completely commutating the load current from each outgoing phase circuit at a predetermined time to the incoming phase circuit before the end of a predetermined fixed and constant overlap period of the corresponding contacts no matter what the load current may be. In this way, the rectifier commutation may be accomplished entirely or if desired principally by the charge stored in the load current responsive series capacitors K1, K2, K3.

In further accordance with the present invention, the commutating reactors R1, R2, R3 are provided with the saturating windings 13, 14 and 15 respectively and these windings are interconnected with the phases P1, P2, P3 through suitable resistors 16, 17 and 18 so as to be reversely saturated and thereby enable the commutating reactors to function also as closing reactors, in the manner explained more fully hereinafter.

Contacts 1, 3, 5 and 4, 6, 2 of mechanical rectifier MR are periodically closed and opened by means of the synchronous motor 20 which may be energized directly from the supply lines L1, L2, L3 as indicated in Fig. 1, and arranged to drive suitable equiangularly displaced contact-operating cams 21, 22 and 23 at synchronous speed with the alternating voltages of the supply lines L1, L2, L3. All of the current conducting contacts may be suitably biased to the closed position in accordance with the usual practice. As shown, cam 21 is arranged to hold both contacts 1 and 4 open and separately close one or the other so that phase P1 will be reversely connected to the load circuit. Thus alternately one or the other contact will connect phase P1 to either the plus or minus direct current line during separate equal angular movements displaced 180 electrical degrees of the cam drive shaft 24, for example periods of 160°. Preferably the contact closure periods are made somewhat longer than the actual required load current conducting periods to compensate for contact wear or inaccuracies or the like. The cam 22 is shown angularly displaced 120° from cam 21 and alternately permits contact 3 and contact 6 to close in accordance with their bias to interconnect phase P2 to either the plus or minus supply line of the variable direct current load VL, during similar equal angular movements of the drive shaft 24. Similarly, cam 23 is shown angularly displaced 120° from both cams 21 and 22 so as to alternately permit contacts 5 and 2 to close in accordance with their bias to interconnect phase P3 with either the plus or minus supply line of the variable load VL, upon similar equal angular movements of drive shaft 24. In this way, as indicated in Fig. 2A, the duration of the closure of each outgoing phase contact will be overlapped with the duration of the closure of the succeeding incoming phase contact on the same D. C. bus so that the load current of the bus can be transferred from the outgoing phase circuit to the incoming phase circuit during fixed contact overlap periods.

In accordance with the present invention, the contact overlap periods are synchronized with the alternating voltages of phases P1, P2, P3 so that the phase to phase voltage between the phases interconnected by each pair of overlapping contacts reverses during the contact overlap period. Such reversal may be effected substantially in the middle or preferably near the end of the first half of the contact overlap period in order to substantially equalize and thereby substantially balance out or eliminate the normal phase to phase voltage commutating action. Such synchronization of the contact overlap period enables the load current charging of the series capacitors K1, K2, K3 to supply all or practically all of the volt seconds required to transfer the load current from the outgoing phase to the incoming phase during a fixed or constant contact overlap period irrespective of the value of the load within the ultimate capacity of the rectifier. This will now be more fully explained in connection with variable load operation of the rectifier indicated in the several diagrams of Fig. 2.

As shown in Fig. 2A the time intervals T1, T2, T3, T4, T5 and T6 represent the durations of closure of the corresponding contacts 1, 2, 3, 4, 5, and 6 as produced by motor 20 in rotating the angularly displaced contact operating cams 21, 22 and 23 with the improved synchronization for reversing the phase to phase voltages during the contact overlap periods in the manner just described. Such successive closures of the contacts 1, 3 and 5 of Fig. 1 will serve to connect the phases P1, P2, P3 successively to the plus supply line of the load and the successive closure of the contacts 4, 6 and 2 of Fig. 1 will serve to connect the phases P1, P2, P3 successively to the negative supply line of the variable load VL.

It will be observed that the improved predetermined synchronism of the contact closures shown in Fig. 2A with the periodic variations of the phase to neutral voltages that are shown in Fig. 2B as E-N1, E-N2 and E-N3 is such that the phase to phase voltage between phases P1 and P2 will reverse during each overlap period O1-3 of contacts 1 and 3. Thus, when incoming phase contact 3 is closed to start the contact overlap period O1-3, the phase to neutral voltage E-N1 is substantially greater than the phase to neutral voltage E-N2, whereas when the outgoing phase contact 1 opens to end the overlap period O1-3, the phase to neutral voltage E-N2 is materially greater than the phase to neutral voltage E-N1. Hence, it will be evident that the phase to phase voltage between phase P1 and phase P2 has reversed and thus substantially neutralized the effect thereof during the contact overlap period O1-3.

In further accordance with the present invention, the point of equality of the phase to neutral voltages E-N1 and E-N2 indicated as occurring at instant T1-2 is synchronized to occur substantially midway or preferably near the end of the first half of the overlap period O1-3 since the final part has been intentionally extended to take care of contact wear or inaccuracies or the like. In this way the phase to phase volt-seconds between the phases P1 and P2 interconnected by the contacts 1 and 3 during the initial and final part of the overlap period O1-3 are substantially balanced and thereby equalized so as effectively to eliminate any resultant commutating action thereby during the whole overlap period. However, under no-load conditions, i. e., L0 as shown in Fig. 2D, the phase to phase voltage effective during the initial part of the overlap period O1-3 will start a circulating current through contacts 1 and 3 and the phase circuits P1 and P2 in one direction while the reversed phase to phase voltage during the final part of the overlap period O1-3 is effective in the opposite direction to stop the circulating current. Under such no-load conditions as shown in Fig. 2D the commutating capacitors K1, K2, K3 will be substantially uncharged at both the beginning and end of the overlap period O1-3.

When load is applied to the rectifier of some intermediate value such, for example, the value Lx shown in Fig. 2E then the commutating capacitors K1, K2, K3 will be charged proportionately to the value of the load current Lx and the polarity of each series capacitor voltage will automatically be reversed in the opposite half cycles of the phase voltage as indicated in Fig. 2C. Consequently, the combined voltages of the separate commutating capacitors K1, K2, K3 in the successive phases that are interconnected during the corresponding contact overlap periods O5-1, O1-3, O3-5, O2-4, D4-6 and O6-2 are jointly effective to produce the transfer of the load current from each outgoing phase circuit to the incoming phase circuit at substantially the same right time during the corresponding contact overlap periods. Thus, when the closure of contact 3 overlaps the closure of contact 1 during the overlap period O1-3, the combined voltages of capacitors K1, K2 that are of opposite polarity become effective to stop the flow of current of value Lx in the outgoing phase and start the flow of load current of corresponding value Lx in the incoming phase as indicated in Fig. 2E.

At the beginning of overlap period O1-3 when the combined opposite voltages of the series capacitors K1 and K2 are effective in the phases P1 and P2 interconnected by the overlapping contacts 1 and 3, the phase to phase voltage may initially predominate in case the load current Lx is not of sufficient value in charging the condensers to produce a combined voltage equal to or greater than the phase to phase voltage. In this case, as illustrated in Fig. 2E, the current of the incoming phase P1 may initially start to flow in the reverse direction at the beginning of overlap period O1-3 under the limitation of the closing reactor but shortly the combined capacitor voltages will predominate over the phase to phase voltage and the current in the incoming phase P1 will be built up to the load value Lx so that the contact 3 will be carrying the entire load current Lx before contact 1 opens to end the overlap period O1-3.

In case the rectifier load current is increased to some higher value LY near the ultimate for which the rectifier is designed as indicated in Fig. 2F, then the commutating capacitors K1, K2, K3 will be charged by the increased load current to sufficiently high voltages that at the beginning of each overlap period the joint capacitor voltages will substantially equal the phase to phase voltages. Consequently, during the overlap period O1-3, there will be no reverse current flow in the incoming phase contact 3 and the load current will rapidly build up to the full load value LY in the incoming phase before the end of the fixed contact overlap period.

In order to enable the commutating capacitors K1, K2, K3 to effect transfer of the load current from the outgoing phase to the incoming phase under widely variable load conditions as outlined above, the two capacitors in the outgoing and incoming phases must jointly and cumulatively contribute the required volt seconds during each contact overlap period. If the load current is represented as $I_d$, the frequency as $f$, and the capacitance in farads as C, each capacitor will have a voltage of $$\tfrac{1}{2} \times \frac{I_d}{3fC}$$

at the start of commutation, namely, when the contact overlap period begins if the assumption of perfectly trapezoidal voltage waves is made. The volt seconds VS required to transfer current between the two inductive phase circuits P1, P2, each having a fixed reactive impedance value of $L_c$ is $VS = 2L_c I_d$. The required volt-seconds are supplied cumulatively by the capacitors K1, K2 in the time $2\lambda$ where $\lambda$ is the lead angle in radians of preclosing of the contacts before the instant or time $T_{1-2}$ of equality of the phase to neutral voltages of phases P1 and P2. Thus, neglecting the capacitor voltage change during commutation, we have $$VS = 2L_c I_d = 2 \times 1/2 \times \frac{I_d}{3fc} \times \frac{2\lambda}{2\pi f}$$

$$2\pi f L_c = \frac{\lambda}{3fc} = \frac{2\pi\lambda}{3} \times \frac{1}{2\pi fc}$$

Hence, $$\lambda = \frac{3}{2\pi} \times \frac{X_c}{X_k}$$

radians where $X_c$ is the total commutating reactance in ohms per phase and $X_k$ is the series capacitive reactance in ohms. This may also be expressed $$\lambda = 27.4 \frac{X_c}{X_k} \text{(degrees)}$$

where $X_c$ and $X_k$ represent ohmic or per unit values.

Thus, it will be seen that the capacitance impedance value of each series capacitor K1, K2, K3 preferably is made such that the charges stored in the corresponding capacitors by the load current will become cumulatively effective to furnish the volt seconds required for commutating that particular value of the rectifier current between the successive phase circuits in a time equal to twice the contact preclosing angle $\lambda$. In such a case, the load current commutation will always be accomplished in a time equal to twice the preclosing angle, no matter what the value of the load current may be. Theoretically the opening angle of the outgoing phase contact can be made of the same magnitude as the preclosing angle of the incoming phase contact. However as a practical matter in order to introduce a suitable factor of safety to insure that the outgoing contact never is opened at an angle less than the incoming contact preclosing angle due to abnormal wear of the contacts or operating mechanism or faulty contact adjustment or the like, preferably the operating cams 21, 22 and 23 are so formed and synchronized that the opening angle of the outgoing contact is always somewhat greater than the preclosing angle of the incoming contact. In this way, the synchronizing cam means will preclose each incoming phase contact a predetermined interval before the incoming phase voltage equals the outgoing phase voltage and open the outgoing phase contact a greater interval thereafter in overlapping the conducting periods of the contacts. This will slightly increase the total length of each contact overlap period over the time theoretically necessary for the complete commutation of the load current but such contact overlap periods can then always remain fixed and constant for all values of load current under all practical operating conditions. Thus, as a practical matter some added contact overlap time is desirable as a safety factor and may be ten percent or twenty percent or other desired percent of the total contact overlap time and still conform with the improved principle of the present invention. The important criterion is that the commutation of all values of load current be completed at the same predetermined time during the fixed commutating periods.

Thus, the improvements of the present invention enable the contact overlap periods of the rectifier to remain constant over the entire load range from zero upwards and this in turn enables the size of the commutating reactor to be reduced to a minimum value. Theoretically, the size of the commutating reactor approaches zero and its actual size is determined largely by the safety margin selected to compensate for variations in contact wear, adjustment, or other practical operating conditions.

In further accordance with the present invention, the commutating reactors R1, R2, R3 are arranged to be reversely excited so as to enable them to function also as closing reactors and thereby limit to a negligible value the reverse current produced by the phase to phase voltage at zero or relatively light loads when each contact overlap period starts. As previously described, the exciting winding 15 of the commutating reactor R2 may be energized through the resistor 18 by the line voltage between phases P1 and P2. As a result, the magnetization of reactors R1, R2, R3 will be varied substantially sinusoidally under no load conditions as indicated in Fig. 2G. However, under such no load conditions, temporary dips or loops in the magnetization of the corresponding reactors will automatically occur at the beginning of each contact overlap period of the incoming phase contact with the outgoing phase contact. Such desaturation of the corresponding reactor will oppose the tendency for current to flow in the incoming phase in the reverse direction, since the magnetization of the reactor will be decreased by such current flow. Thus, when under no-load conditions the maximum reversed phase to phase voltage is effective in the interconnected phases P1, P2, reactor R2 is effective to limit any reverse current flow to a relatively negligible value as indicated in Fig. 2D until the point of equal phase voltage is obtained at instant T1–2. Thereupon, the phase to phase voltage will become reversed so as to tend to produce current flow through the reactor R2 in the opposite direction corresponding to normal load current flow. When the phase to phase voltage reverses at instant T1–2, the magnetization of reactor R2 will soon return to its normal value.

Under the intermediate load conditions, as indicated in Fig. 2H, reactor R2 serves in substantially the same way as a closing reactor to limit any reverse current flow between the overlapping contacts in case the phase to phase voltage predominates over the joint voltage of the load current charge capacitors K1, K2. In such a case, the dip or loop in the magnetization curve of reactor R2 will be much smaller. When the maximum load current is being carried by the rectifier, so that the load current charged capacitor voltage substantially equals the phase to phase voltage between phases 1 and 2, then there is no tendency for reverse current to flow and the magnetization of reactor R2 remains substantially constant until the end of the contact overlap period. As contact 3 becomes the outgoing phase contact during the contact overlap period O3–5, then the magnetization of reactor R2 becomes reversed so that the relatively rapid desaturation of the reactor, as indicated in Fig. 2H, then functions in the usual way to limit the current in phase P2 at the end of the contact overlap period to a very low or negligible value for a brief interval during which contact 3 opens to end the overlap period. Reactor R2 will operate in the same way during the opposite half cycles of the phase P2 voltage only with its magnetization changing reversely as contact 6 is closed and opened.

It will be understood that the other commutating reactors R1, R3 function in exactly the same way in connection with the closing and opening of the corresponding phase contacts. Thus, in accordance with the present invention each saturable reactor serves to temporarily limit the current flow between the overlapping contacts at both the beginning and end of each contact conduction period of the corresponding phase.

When it is desired to vary the voltage output of the rectifier, this may readily be accomplished by operating the inductive voltage regulator VR to vary the voltage applied to the primary windings TP of the transformer. In this case, the rectifier will handle the reduced load without requiring any change in the duration of the contact overlap period to overcome sparking due to the provision of the commutating capacitors series connected in each phase. Consequently, the improvements of the present invention enable the mechanical rectifier to operate without any contact sparking under both variable load and variable voltage conditions.

The series capacitor commutating combination of the present invention is not limited to the rectifier circuit arrangement of Fig. 1 but may be embodied in a well-known multiple secondary transformer rectifier arrangement such as shown in Fig. 3 when a materially increased current output of the rectifier is desired. In this case the commutating voltage supply capacitors K1, K2, K3 are connected directly in the supply lines L1, L2, L3 that energize the transformer primary windings TP so as to enable a high voltage type of capacitor to be utilized. During each cycle, the overlapping rectifier contacts 1, 5 and 3 together with the series connected commutating reactors R1, R5, R3 are arranged to conduct the load current in overlapping succession from the terminals of the Y-connected secondary windings TS1 to one load conductor indicated as plus. The overlapping contacts 2, 6 and 4 together with their series connected commutating reactors R2, R6, R4 serve to conduct the load current in overlapping succession from the terminals of the connected transformer secondary windings TS2 to the same conductor. The contact operating sequence is the same as that shown in Fig. 2A for the circuit of Fig. 1. The minus conductor of the load circuit is connected through the interphase transformer IT between the neutral points N1, N2, of the transformer secondary windings TS1 and TS2. Thus with each of the overlapping contacts employed in the connection arrangement of Fig. 3 of the same permissible maximum current carrying capacity as the corresponding contacts in the arrangement of Fig. 1, the total current rating of the rectifier may be materially increased due to the fact that at any time at least two and at times three of the contacts are effective for conducting the load current.

In the multiple secondary circuit arrangement shown in Fig. 3 the series connected capacitor combination K1, K2, K3 in the primary circuits of the transformer serves to provide the desired commutating voltages that will vary proportionally to the load current in substantially the same way as explained in connection with Fig. 1 provided the contacts are preclosed and operated in substantially the same time sequence as indicated in Fig. 2A. The commutating reactors R1, R5, R3 may have their exciting windings connected to be reversely energized from the transformer secondary winding TS1 in substantially the same way as shown in Fig. 1 and the commutating reactors R2, R6, R4 likewise may be reversely excited from the transformer secondary windings TS2 in the same way so as to enable these reactors to serve as both closing and commutating reactors in the manner explained in connection with Fig. 1.

In the modified form of the invention shown in Fig. 4, the commutating voltage producing capacitors K1, K2, K3 also are connected directly in the alternating current supply lines L1, L2 of the delta connected transformer primary windings TP. In this modification a separate or individual commutating reactor is provided for each rectifier contact so as to adapt the rectifier for materially reduced voltage service or in case exceptionally large contact preclosing angles are employed. The operation of the load current charged capacitors K1, K2, K3 to jointly supply the commutating voltages proportional to the load current is accomplished in substantially the same way as explained in connection with Fig. 1. Since each commutating reactor is active as a closing and commutating reactor only in alternate half cycles with the connection arrangement as shown in Fig. 4, a materially greater interval between the periods of reactor activity is provided in order to enable more effective reverse readjustment of the magnetization of the reactor. In this case the reactors R1, R2 and R3 may be reversely energized in substantially the same way as shown in Fig. 1 and the other commutating reactors R4, R5 and R6 may be reversely energized in similar manner.

As will be observed in Fig. 2H, the magnetization of the commutating reactor 2 must become reversely readjusted within a relatively short time interval not materially greater than the contact overlap period, since the reactor R2 must serve as both a closing and commutating reactor in successive half cycles. With the individual commutating reactor for each contact as shown in Fig. 4 each reactor is only required to be active in circuit closing and commutating service in alternate half cycles and hence provides a whole intermediate half cycle for reverse readjustment of the magnetization thereof rather than the relatively shorter contact overlap period as shown in Fig. 2H.

What I claim as new and desire to secure by Letters Patent of the United States is:

1. A polyphase alternating current rectifier having in combination polyphase circuits, a load circuit, a separate pair of separately conducting contact means for each phase circuit having connections for reversely connecting the corresponding phase circuit with the load circuit during successive half cycles of the phase voltage and provided with synchronizing means for closing and opening each contact means respectively a predetermined time before and a longer time after the instant of equality of the corresponding phase voltage during the successive half cycles with the preceding and succeeding phase voltages and thereby produce substantially equal overlap periods of closure of the contact means of the successive phases during the successive half cycles of the phase voltages, and a separate capacitor series connected in each phase circuit for producing a reversible voltage proportional to the load current for commutating the load current between the successive phase circuits during the substantially equal overlap periods of closure of the corresponding contact means.

2. In combination, an alternating current rectifier having polyphase circuits and sequential contact mechanism provided with synchronously operated means and connections for connecting each phase circuit to conduct the load current periodically and overlap the conduction periods of successive phase circuits for commutation of the load current therebetween, and a saturable reactor connected in series with each phase circuit to be saturated by the load current conducted thereby and provided with automatically reversible excitation means synchronized to reverse during each load current conduction period of the corresponding phase circuit for producing opposite desaturation current limiting actions of the reactor respectively at the beginning and end of the conduction period.

3. In combination, an alternating current rectifier having polyphase circuits and sequential contact mechanism provided with synchronously operating means and connections for reversely connecting each phase circuit during successive half cycles of the phase voltage to conduct the load current periodically and overlap the conduction periods of successive phase circuits to provide load current commutating periods of fixed duration at the beginning and end of each conduction period of each phase circuit, and a saturable reactor connected in series with each phase circuit to be reversely saturated by the load current conducted thereby during successive half cycles of the phase voltage and provided with automatically reversible excitation means synchronized to reverse during each load current conduction period for producing opposite desaturation current limiting actions of the reactor respectively during the commutating periods at the beginning and end of each conduction period of the corresponding phase.

4. In combination, an alternating current rectifier having polyphase circuits and sequential contact mechanism provided with synchronously operated means and connections for connecting each phase circuit to conduct the load current periodically and overlap the conduction periods of successive phase circuits for commutation of the load current therebetween, a separate capacitor series connected in each phase circuit for producing a voltage proportional to the load current for commutating the load current between the successive phase circuits, and a saturable reactor connected in series with each phase circuit to be saturated by the load current conducted thereby and provided with automatically reversible excitation means synchronized to reverse during each load current conduction period of the phase circuit for producing opposite desaturation current limiting actions of the reactor respectively at the beginning and end of the conduction period of the corresponding phase.

5. A polyphase alternating current rectifier having in combination polyphase circuits, load current conducting means including a contact for each phase circuit, synchronizing means for closing each contact a predetermined interval before the instant of equality of the corresponding phase voltage with the preceding phase voltage and for opening each contact a predetermined interval after the instant of equality of the corresponding phase voltage with the succeeding phase voltage to overlap the closure of the corresponding contacts for commutation of the load current between the corresponding interconnected phase circuits, a saturable reactor connected in series with each phase circuit to be saturated when load current is conducted thereby for limiting the rate of change of current in the phase circuit just after the corresponding contact closes and just before said contact opens, and excitation means for said saturable reactor to oppositely saturate said reactor during the interval in which the corresponding rectifier contact is open.

6. A polyphase alternating current rectifier having in combination polyphase circuits, a load circuit, a separate pair of separately conducting contact means for each phase circuit having connections for reversely connecting the corresponding phase circuit with the load circuit during opposite half cycles of the phase voltage and provided with synchronizing means for closing and opening each contact means respectively a predetermined time before and a predetermined time after the instant of equality of the corresponding phase voltage during the opposite half cycles with the preceding and succeeding phase voltages and thereby produce substantially equal overlap periods of closure of the contact means of the successive phase circuits during the opposite half cycles of the phase voltages, a saturable reactor connected in series with each phase circuit to be saturated in one direction when the load current is conducted by one of the conducting contact means of said pair and saturated in the opposite direction when the load current is conducted by the other contact means for limiting the rate of change of current immediately after each contact closes and immediately before each contact opens, and automatically reversible excitation means for said saturable reactor synchronized to reverse during each load current conduction period for completing the reversal of saturation of said reactor during the interval after said one contact means is opened and before said other contact means is closed.

7. A polyphase alternating current rectifier having in combination polyphase circuits, load current conducting means including a contact for each phase circuit, synchronizing means for closing each contact a predetermined interval before the instant of equality of the corresponding phase voltage with the preceding phase voltage and for opening each contact a greater predetermined interval after the instant of equality of the corresponding phase voltage with the succeeding phase voltage to overlap the closure of the corresponding contacts for commutation of the load current between the corresponding interconnected phase circuits, and a separate capacitor series connected in each phase circuit for producing voltages substantially proportional to the load current whereby the voltages of the corresponding series connected capacitors become cumulatively effective to effect the commutation of the load current between the corresponding interconnected phase circuits in a predetermined time before the end of each overlap period of the corresponding contacts.

8. In combination, a mechanical rectifier having polyphase alternating current circuits provided with overlapping load current rectifying contact means and synchronizing means for preclosing the contact means of each incoming phase circuit a predetermined interval before the incoming phase voltage equals the outgoing phase voltage and opening the contact means of each outgoing phase circuit a greater interval thereafter, and a separate capacitor series connected in each phase circuit to be charged proportionately to the load current supplied thereby and each having a predetermined capacitive impedance substantially proportional to the ratio of the impedance of the corresponding phase circuit to the fixed overlap time for jointly producing commutating voltages proportional to the load current for completing the transfer of the variable load current from the outgoing phase circuit to the incoming phase circuit at substantially the same time during the overlap of the corresponding contact means.

References Cited in the file of this patent

UNITED STATES PATENTS

| | | |
|---|---|---|
| 1,952,062 | Fecker | Mar. 27, 1934 |
| 2,193,421 | Janetschke | Mar. 12, 1940 |
| 2,209,806 | Bedford | July 30, 1940 |
| 2,220,747 | Westendorp | Nov. 5, 1940 |
| 2,276,784 | Koppelmann | Mar. 17, 1942 |
| 2,284,794 | Bedford | June 2, 1942 |
| 2,428,586 | Rose | Oct. 7, 1947 |
| 2,436,324 | Pakala et al. | Feb. 17, 1948 |
| 2,584,535 | Belamin | Feb. 5, 1952 |
| 2,697,198 | Schmidt | Dec. 14, 1954 |

FOREIGN PATENTS

| | | |
|---|---|---|
| 244,943 | Switzerland | Oct. 15, 1946 |